June 13, 1939.　　　　H. T. AVERY　　　　2,162,237
ELECTRICAL CONTROL DEVICE
Filed Nov. 27, 1936　　　　2 Sheets-Sheet 1
FIG_1_
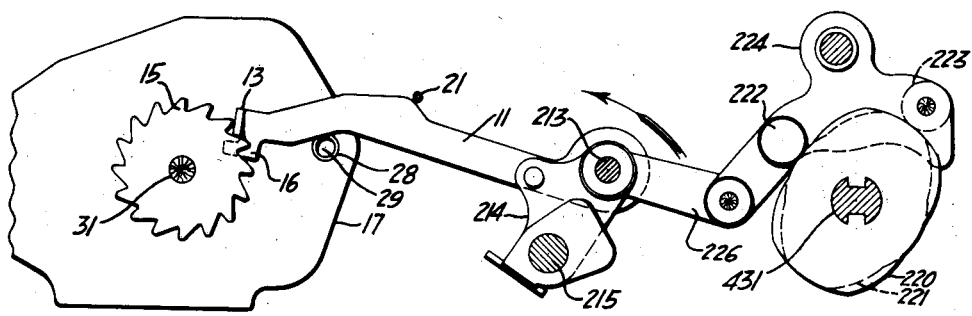
FIG_2_
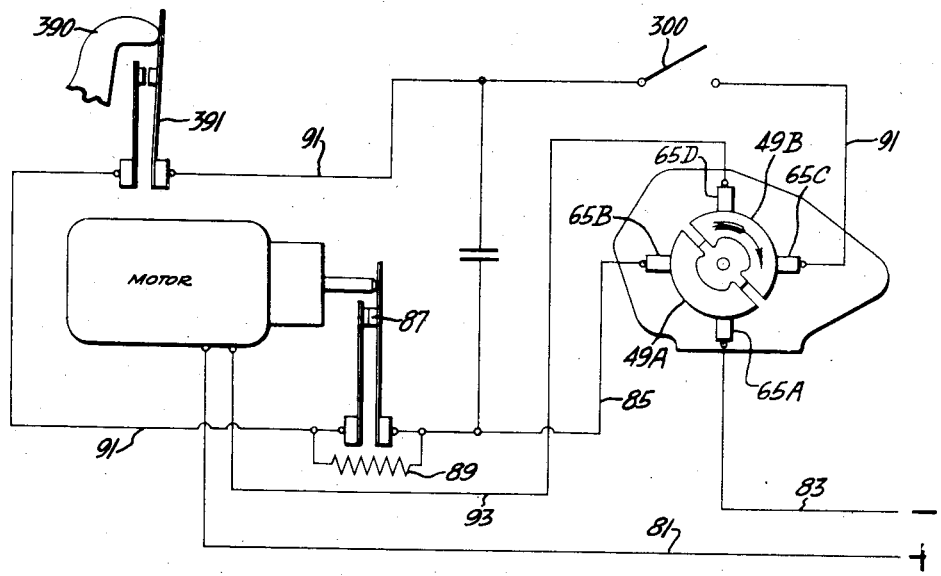
INVENTOR.
Harold T. Avery
BY
ATTORNEY.

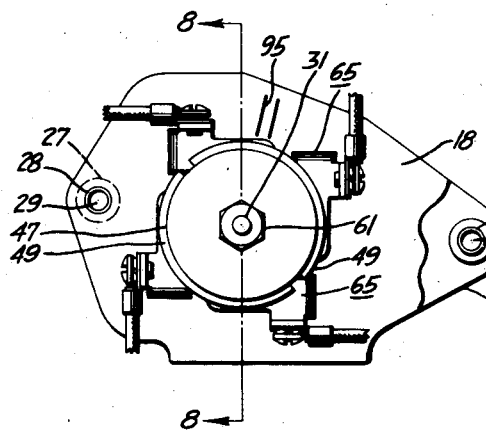
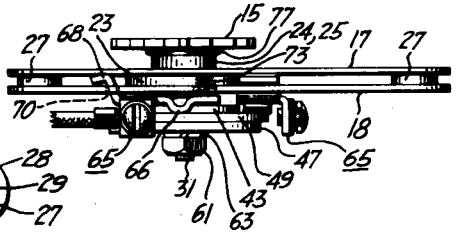
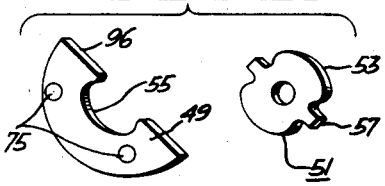
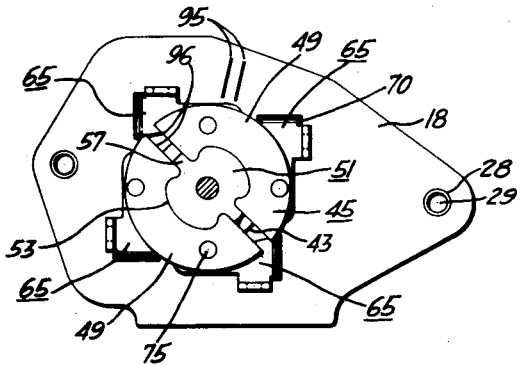
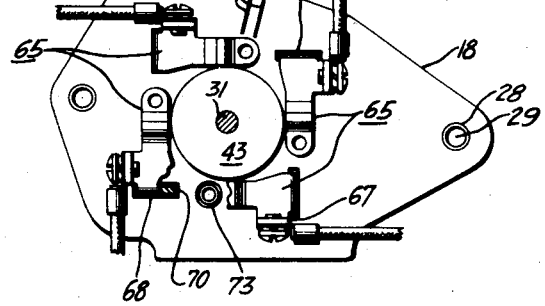
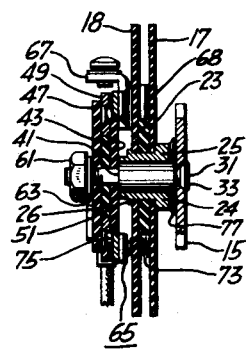
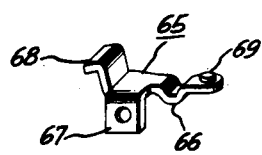

Patented June 13, 1939

2,162,237

UNITED STATES PATENT OFFICE 2,162,237

ELECTRICAL CONTROL DEVICE

Harold T. Avery, Oakland, Calif., assignor to Marchant Calculating Machine Company, a corporation of California Application November 27, 1936, Serial No. 112,897

1 Claim. (Cl. 171—222)

The present invention relates to electrical control devices and pertains more particularly to means for preventing rapid deterioration of electrical contacts which are subjected to frequent operation in such devices.

In such control devices as, for instance, electric motor governors of the general type disclosed in the patent to Ulmer, Number 1,795,240, issued March 3, 1931, which depend upon repeated opening and closing of contacts controlled by means responsive to motor speed to maintain the motor at a selected speed, it has been found that operation on direct rather than on alternating current, deleteriously affects the contact surfaces, the contact on one side of the line pitting quite rapidly, and that on the other side of the line building up.

It has been found practicable to prevent such deterioration of the contact surfaces by reversing the direction of current flow between such contact faces at intervals, and it is an object of the present invention to provide a mechanism for effecting such reversal of the direction of current flow as an incident to a normal operation of any machine to which the control device is applied.

It is a further object of the invention to provide a circuit arrangement whereby the direction of current flow between control contacts may be reversed without effecting a reversal of the direction of current flow through a motor to which current is supplied through said contacts, thus not only preventing short circuiting of the power supply line where a polarity reversing switch of the type hereinafter described is used, but also making it possible to avoid reversal of a motor the direction of operation of which depends upon the direction of current flow therethrough.

A further object of the invention is the provision of a circuit arrangement for the reversal of the direction of current flow through control contacts which will avoid any possibility of creating a short circuit across the main supply line, upon operation of said current reversing means while the respective circuits are energized.

A further object of the invention is the provision of an efficient and economically designed switch mechanism for the foregoing purposes, and actuating devices for the same whereby the frequency of the reversals of the direction of current flow may, if desired, be reduced in number as compared with the number of initiations of the operation of a machine of which they form a part.

Other objects and advantages of the present invention will appear from the following description of a specific embodiment thereof, reference being had to the accompanying drawings forming a part of this specification in which:

Figure 1 is a detail view in side elevation of a reversing switch embodying the present invention, and of the actuating devices therefor;

Figure 2 is a circuit diagram;

Figure 3 is a view in side elevation of a preferred form of reversing switch embodying the present invention;

Figure 4 is a view in plan thereof;

Figure 5 is a view in elevation of said switch, with certain parts removed to show details of the construction of the contact segments;

Figure 6 is a detail view of one of the contact segments and an element of the operating means therefor;

Figure 7 is a view in elevation of said switch, with the contact segments also removed to show the arrangement and construction of the brush elements;

Figure 8 is a sectional view taken on the line 8—8 of Figure 3; and

Figure 9 is a detail, perspective view of one of the brush elements.

In the accompanying drawings the invention is shown as applied to a calculating machine of the character described in Swiss Patent No. 183,500 issued April 15, 1936 corresponding, in all pertinent matters, to the copending United States application of Harold T. Avery, Serial Number 702,949, filed December 18, 1933, driven by a governed motor of the type above described. It is not necessary that the direction of current flow through the control contacts be reversed at extremely frequent intervals in order to prevent deterioration of the character hereinbefore described, and it would, in fact, be sufficient if such reversal of the direction of current flow were effected at approximately half-hour intervals in the course of the machine's operation. Since more frequent reversals are unnecessary, the wear incident to operation of any current reversing device may be substantially reduced by connecting it to the machine in such a manner as to effect its operation as infrequently as is consistent with automatic operation thereof by the machine, without special attention by the operator.

In the calculating machine above referred to, the setting clutch shaft 431, shown in Figure 1 of the present disclosure, is rotated 180° at the commencement of machine operation, and is thereafter held stationary even though other parts of the machine may continue to operate under power from the motor for a plurality of cycles thereafter. Mounted on this shaft 431 in the machine as described in the above mentioned application, are cams 220 and 221 which, through rollers 222 and 223, are adapted to rock a cam follower 224 to impart a leftward oscillation through link 226 to shaft 213 supported on member 214 pivotally mounted on shaft 215, each time shaft 431 is rotated 180°.

Since these parts are infrequently operated, yet are inevitably operated during the normal use of the calculating machine, they are particularly adapted for operating the switch of the present invention. It will be understood, however, that any more frequently operated parts of the machine might be used, although they would be less satisfactory for the purpose.

Freely mounted on shaft 213 is an arm 11, the remote end of which is provided with a turned lug 13 which serves as an actuating tooth for the ratchet wheel 15. An extension 16 on the end of arm 11 projects between the ratchet wheel 15 and the plate 17 to prevent lateral disengagement from the ratchet wheel of the tooth 13; while stud 21 on the frame of the machine serves to prevent the tooth 13 from rising out of engagement with the ratchet wheel 15, the arm being contoured adjacent the stud 21 to permit the normal operating movement of arm 11 to advance ratchet wheel 15 step by step.

The reversing switch, as shown in Figures 3, 4, and 8, in particular, is mounted upon spaced plates 17 and 18, preferably made of insulating material. A disk 23, also preferably of insulating material is disposed between the plates 17 and 18 determining the spacing thereof, and a bushing 24 passed through said plates and said disk is provided with a shoulder 25 adjacent plate 17 and an offset 26 adapted to be spun to overlie a portion of plate 18, thus holding the said plates and disk in assembled relationship.

The portions of the plates 17 and 18 remote from the bushing 24 are maintained in properly spaced relationship by a plurality of spacers 27 having extensions 28 adapted to fit snugly within holes in the plates. The spacers 27 are also preferably provided with apertures 29 through which bolts or the like may be passed to secure the switch to the frame of a machine.

Ratchet wheel 15 is fixed upon a shaft 31 as, for instance, by riveting over the end of the shaft at 33, and said shaft is rotatably mounted in the bushing 24, above described. The end of the shaft 31 remote from ratchet wheel 15 is reduced in diameter providing a shoulder 41, and upon the reduced portion of the said shaft are received an insulating disc 43 (see also Figure 7), the commutator segment disc assembly 45 (see also Figures 5 and 6), and a second insulating disc 47.

As shown in Figures 5 and 6, the commutator segment disc assembly 45 comprises a pair of identical metallic commutator segments 49 and a retainer therefor consisting of a member 51, of insulating material, having lobes 53 fitting complementary recesses 55 of the segments 49, to provide a dovetail keyed connection, and also having projections 57 extending between the segments 49 to space them from each other.

Members 43, 51, and 47 are received upon the reduced end of shaft 31 and secured thereto by means such as nut 61 which compresses lock washer 63 to press the aforementioned elements firmly against shoulder 41 of shaft 31. The three elements are thus constrained to rotate with the shaft 31, segment 49 having a dovetail keyed connection with the member 51 as aforesaid, and being restrained against lateral displacement with respect thereto by the insulating discs 43 and 47.

Rockably mounted with respect to plates 17 and 18 are four brushes 65 adapted to make electrical contact with the two commutator segments 49. Each of these brushes, as shown in detail in Figure 9, is formed with an electrical contacting face 66, a connection lug 67, and an offset end 68, whereby the brush may be rockably mounted by inserting said end through a slot 70 in plate 18 so that it extends between the plates 17 and 18. Preferably the opposite end of the brush is also provided with a swedged projection 69 adapted to serve as a spring anchor, as hereinafter described.

Each of the brushes 65 is thus mounted, as best shown in Figure 4, with its offset end 68 projecting through one of the four slots 70 of plate 18 and rockably contacting the plate 17. A spring 73, compressed between the spring anchor projection 69 and the plate 17 and passing through an aperture in plate 18, maintains the contact face 66 of each brush pressed against one of the contact segments 49.

To prevent excessive wear between the contact brushes 65 and segments 49, and at the same time insure the maintenance of good electrical contact between them, each of the segments 49 is preferably provided with a plurality of apertures 75 filled with a conductive lubricant such as graphite.

There may be sufficient friction between the brushes 65 and the contact segments 49 to prevent movement of the segments with respect to the brushes during the retraction of the operating arm 11 to engage a new tooth of the ratchet wheel 15. However, additional means for frictionally resisting rotation of the shaft 31 in order to prevent such movement, may be provided in the form of a spring washer 77 compressed between the ratchet wheel 15 and the end of the bushing 24.

It will be observed that as the gap between segments 49 passes under a brush 65, one brush 65 may momentarily contact both of the segments 49, and thus, if the switch were disposed in the main current supply circuit so as to effect a reversal of the direction of current flow through the motor proper, as well as through the governor contacts, a momentary short circuit would be produced across the main current supply line which might result in substantial damage. The present invention therefore contemplates disposing the above described reversing switch in the circuit of a governed motor or similar device so as to effect reversal of the direction of current flow through the make and break contacts of the motor governor without reversing the direction of current supply through the motor itself. In this way there can be no danger of short circuiting the main supply line even momentarily, since the effect of a brush 65 contacting both of the segments 49 will be merely to shunt out the make and break contacts of the motor governor and cause a momentary speeding up of the motor without any deleterious effects whatever.

It is desirable, however, in installing the reversing switch to make sure that an operation of the arm 11 may carry one segment 49 completely out of contact with a brush 65 and the other segment 49 fully into contact therewith, insuring that this operating means will not leave both segments 49 in contact with the same brush at the end of an actuation of the switch. Otherwise the governor would be wholly ineffective until the next actuation of the switch and the motor would operate ungoverned.

Such adjustment may be effected merely by loosening nut 61 and rotating the segment assembly 45 on shaft 31 into the proper relationship, as above indicated, with ratchet wheel 15. To assist in such adjustment, lines 95 may be inscribed on plate 18 and segment assembly 45 rotated with respect to ratchet wheel 15 so as to bring the chord edges 96 of segments 49 parallel to lines 95 when the arm 11 is at the end of its driving stroke.

As diagrammatically illustrated in Figure 2, one side of the current supply line 81 runs directly to the motor; while the other side 83 is connected to one of the brushes 65 of the reversing switch. With the segments 49 of the reversing switch in the position in which they are shown in Figure 2, the brush 65A connected to the line 83 is connected by one of the segments 49A to the brush 65B connected to lead 85; hence current will pass from lead 83 through the first brush 65A, the segment 49A, the second brush 65B, and the lead 85, through either contacts 87 or resistance 89 as the contacts may be opened and closed as an incident to the action of the governor driven by the motor. Thence, the current will pass through lead 91 to brush 65C and thence through commutator segment 49B to brush 65D and thence via lead 93 to the motor.

Now, if the commutator segments 49 are considered to be rotated through 90°, it will be observed that current entering via lead 83 and brush 65A will now flow via commutator segment 49B to brush 65C and thence via lead 91 to contacts 87 and resistance 89, approaching the said contacts 87, however, in the opposite direction. Thence, it will be conducted via lead 85 to brush 65B; whence it will pass via commutator segment 49A to brush 65D and lead 93 to motor.

If a short is created by an overlapping of any brush 65 into contact with both of the segments 49, it will be apparent that current entering via lead 83 and brush 65A would pass through the segments 49A and 49B directly to brush 65D and thence through lead 93 to motor without passing through the contacts 87 or the resistance 89. This is merely equivalent, however, to disabling the governor mechanism so that contacts 87 which are normally opened as the motor reaches the speed at which it is desired to operate it can not open any circuit to the motor. The motor would race above its normal governed speed but no injury would be possible.

In the calculating machine disclosed in the application hereinbefore identified, there is also provided a stop and start switch 391 normally held open by an arm 390 which is rocked by the operation of any of the machine operation controls to permit the said contacts to close. Operation of the motor is initiated by closure of these contacts 391, as indicated in Figure 2, and interrupted upon their reopening so that motor operates only when it is required to drive the machine.

Although contacts 391 are not opened and closed as frequently as the governor contacts 87, they are nevertheless subject to some degree to similar deterioration when the machine is operated on direct current. It is therefore desirable to place them in series with the contacts 87 in the circuit connecting brush 65B with brush 65C so that the reversing switch will also reverse the direction of the flow of current through contacts 391.

The main switch 300 is not ordinarily opened or closed while contacts 391 are closed, although it may be so operated. It may be placed, therefore either in series with contacts 87 and 391 between the aforesaid brushes, or in one of the main power supply leads 81 and 83.

It has been pointed out heretofore that the arm 11 by which the ratchet wheel 15 is operated receives an actuation ordinarily only once in several cycles of operation of the calculating machine. In order to render the operation of the reversing switch still less frequent, the ratchet wheel 15 is provided with a relatively large number of teeth, illustrated in this case as 16. As a result, several operations of the arm 11 are required to effect each successive reversal of current by the reversing switch in the particular form disclosed herein. By this means any desired ratio of operations of the machine to operations of the switch may be obtained, and various ratios will undoubtedly be found desirable in various applications of the present invention to different devices.

In the foregoing specification a preferred form of a device embodying the invention has been disclosed, but it is understood that many variants may be constructed according to the skill of those engaged in the art. The invention therefore, is not to be considered as limited except as required by the prior art, and the spirit of the appended claim.

What is claimed is:

A governing system for an electric motor, having power supply leads; comprising a make and break contact mechanism operable by the motor to control the speed thereof, means comprising a polarity reversing switch connected to one of said leads, to said contact mechanism, and connected to one side only of an electric current supply line so as to reverse the direction of the flow of current through said contact mechanism without interrupting the flow of current through the motor, and means actuated by the motor for periodically effecting step by step operation of said switch.

HAROLD T. AVERY.